US009392202B2

(12) United States Patent
Araoka

(10) Patent No.: US 9,392,202 B2
(45) Date of Patent: Jul. 12, 2016

(54) SCANNING CIRCUIT, PHOTOELECTRIC CONVERSION APPARATUS, AND IMAGE PICKUP SYSTEM FOR SPECIFYING A REGISTER WHERE SCANNING IS SKIPPED AMONG A PLURALITY OF REGISTERS

(71) Applicant: CANON KABUSHIKI KAISHA, Tokyo (JP)

(72) Inventor: Yukio Araoka, Hiratsuka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 58 days.

(21) Appl. No.: 14/322,799

(22) Filed: Jul. 2, 2014

(65) Prior Publication Data

US 2015/0009381 A1   Jan. 8, 2015

(30) Foreign Application Priority Data

Jul. 5, 2013   (JP) .................................. 2013-141203

(51) Int. Cl.
*H04N 5/378* (2011.01)
*H04N 5/345* (2011.01)
*H04N 5/376* (2011.01)

(52) U.S. Cl.
CPC ............... *H04N 5/378* (2013.01); *H04N 5/345* (2013.01); *H04N 5/376* (2013.01)

(58) Field of Classification Search
CPC ........ H04N 5/378; H04N 5/345; H04N 5/376
See application file for complete search history.

(56) References Cited

U.S. PATENT DOCUMENTS

| 5,883,668 A | 3/1999 | Kazama |
| 8,842,473 B2* | 9/2014 | Tsai ..................... G11C 29/848 365/185.09 |
| 2007/0229686 A1* | 10/2007 | Hiyama ............... H04N 5/3456 348/294 |
| 2011/0199524 A1* | 8/2011 | Noda ................... H04N 3/1512 348/304 |
| 2013/0242154 A1* | 9/2013 | Kobayashi .............. H03M 1/12 348/302 |
| 2013/0242655 A1* | 9/2013 | Tsai ..................... G11C 29/848 365/185.09 |

FOREIGN PATENT DOCUMENTS

| GB | 2113949 A | 8/1983 |
| JP | 2006-140549 A | 6/2006 |
| JP | 2006-340090 A | 12/2006 |
| JP | 2007-158741 A | 6/2007 |

OTHER PUBLICATIONS

Translation of Japanese Publication No. JP2006-340090 published Dec. 14, 2006.*

* cited by examiner

*Primary Examiner* — Nicholas Giles
(74) *Attorney, Agent, or Firm* — Canon USA, Inc. IP Division

(57) ABSTRACT

A scanning circuit includes a first shift register including a plurality of registers and being operable to specify a register where scanning is skipped among the plurality of registers, and a second shift register adapted to transmit skip information for specifying the register to be skipped.

14 Claims, 11 Drawing Sheets

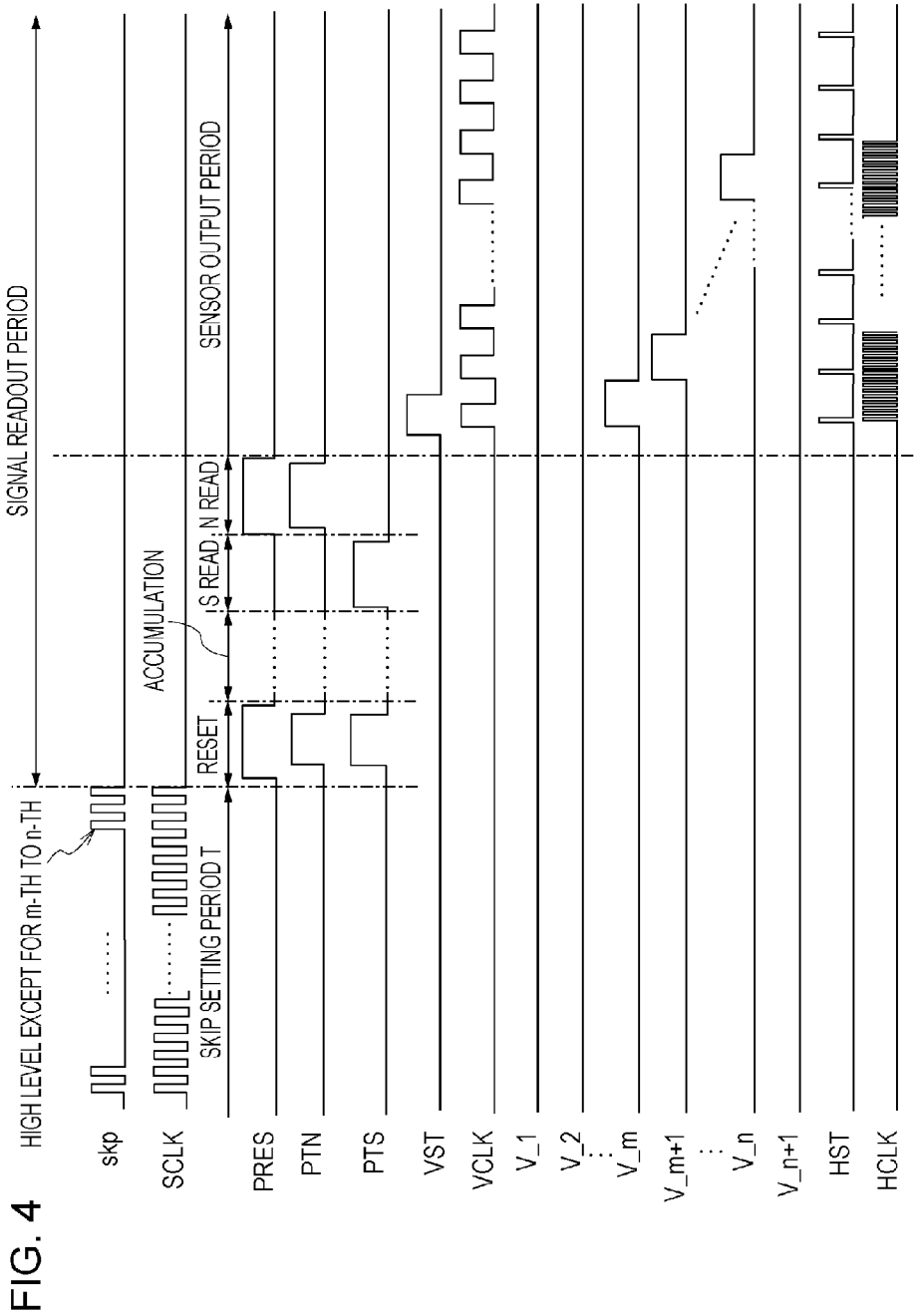

SCANNING CIRCUIT, PHOTOELECTRIC CONVERSION APPARATUS, AND IMAGE PICKUP SYSTEM FOR SPECIFYING A REGISTER WHERE SCANNING IS SKIPPED AMONG A PLURALITY OF REGISTERS

BACKGROUND OF THE INVENTION

1. Field of the Invention

The present invention relates to a scanning circuit, a photoelectric conversion apparatus, and an image pickup system.

2. Description of the Related Art

In an image pickup apparatus, it is known that a shift register is used to select a plurality of pixels arranged in a matrix. It is also known that in the image pickup apparatus, a signal is read out from a part of an area in a pixel portion.

Japanese Patent Laid-Open No. 2006-140549 discloses a combination of a decoder configured to specify addresses of an area where no signal is read out and an area where the signal is read out, and a shift register configured to sequentially perform scanning to realize a window cutout readout.

However, since the decoder is provided, the circuit becomes complicated.

SUMMARY OF THE INVENTION

A scanning circuit according to an aspect of the present invention includes: a first shift register including a plurality of registers and being operable to specify a register where scanning is skipped among the plurality of registers; and a second shift register adapted to transmit skip information for specifying the register to be skipped.

A scanning circuit according to another aspect of the present invention includes a first shift register including a plurality of registers and being operable to specify a register where scanning is skipped among the plurality of registers and a plurality of memories, in which the first shift register transmits skip information for specifying the register to be skipped, and the plurality of memories hold the transmitted skip information.

Further features of the present invention will become apparent from the following description of embodiments with reference to the attached drawings. Each of the embodiments of the present invention described below can be implemented solely or as a combination of a plurality of the embodiments or features thereof where necessary or where the combination of elements or features from individual embodiments in a single embodiment is beneficial.

BRIEF DESCRIPTION OF THE DRAWINGS

FIG. 4 is a timing chart for describing an operation according to the first embodiment.

DESCRIPTION OF THE EMBODIMENTS

Embodiments of the present invention will be described with reference to the drawings.

First Embodiment

Figure 1:
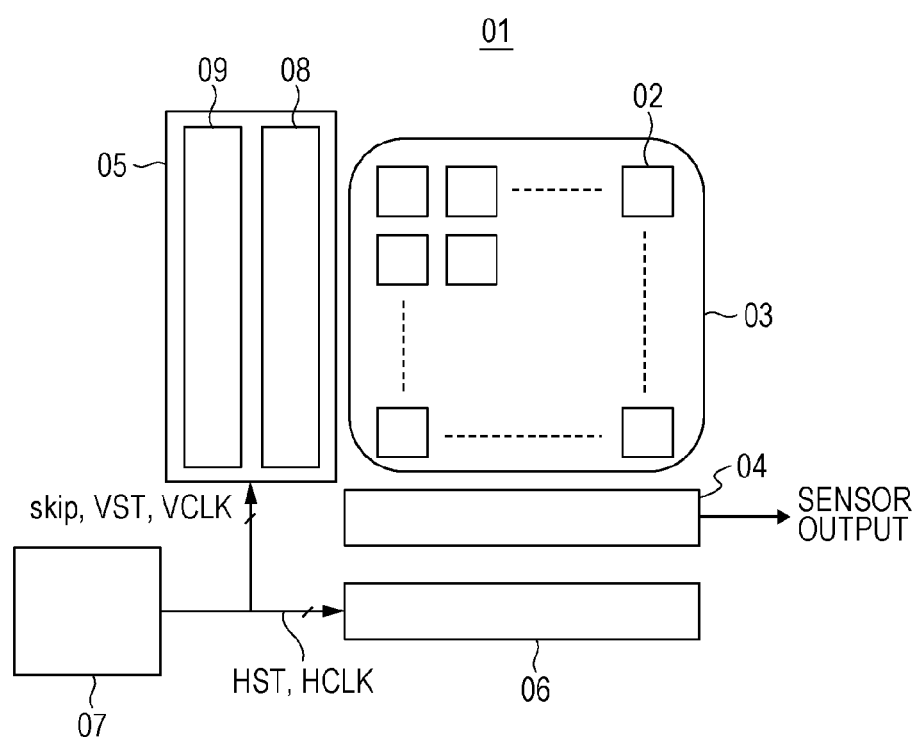
FIG. 1 is a block diagram of a configuration of a photoelectric conversion apparatus according to a first embodiment.

FIG. 1 is a block diagram of a configuration of a photoelectric conversion apparatus according to the present embodiment. A photoelectric conversion apparatus 01 includes a pixel array 03 in which a plurality of pixels 02 are arranged in a matrix, and a column signal processing unit 04. The photoelectric conversion apparatus 01 further includes a vertical scanning circuit 05 functioning as a row selection unit configured to control operations in the pixels 02 in units of rows, a horizontal scanning circuit 06, and a control unit 07. The pixels 02 in the respective columns are connected to the column signal processing units 04 via signal lines. Each of the column signal processing units 04 includes, for example, a buffer that buffers a signal from the pixel 02, an amplifier, or a noise reduction circuit such as a correlated double sampling (CDS) circuit.

Figure 2:
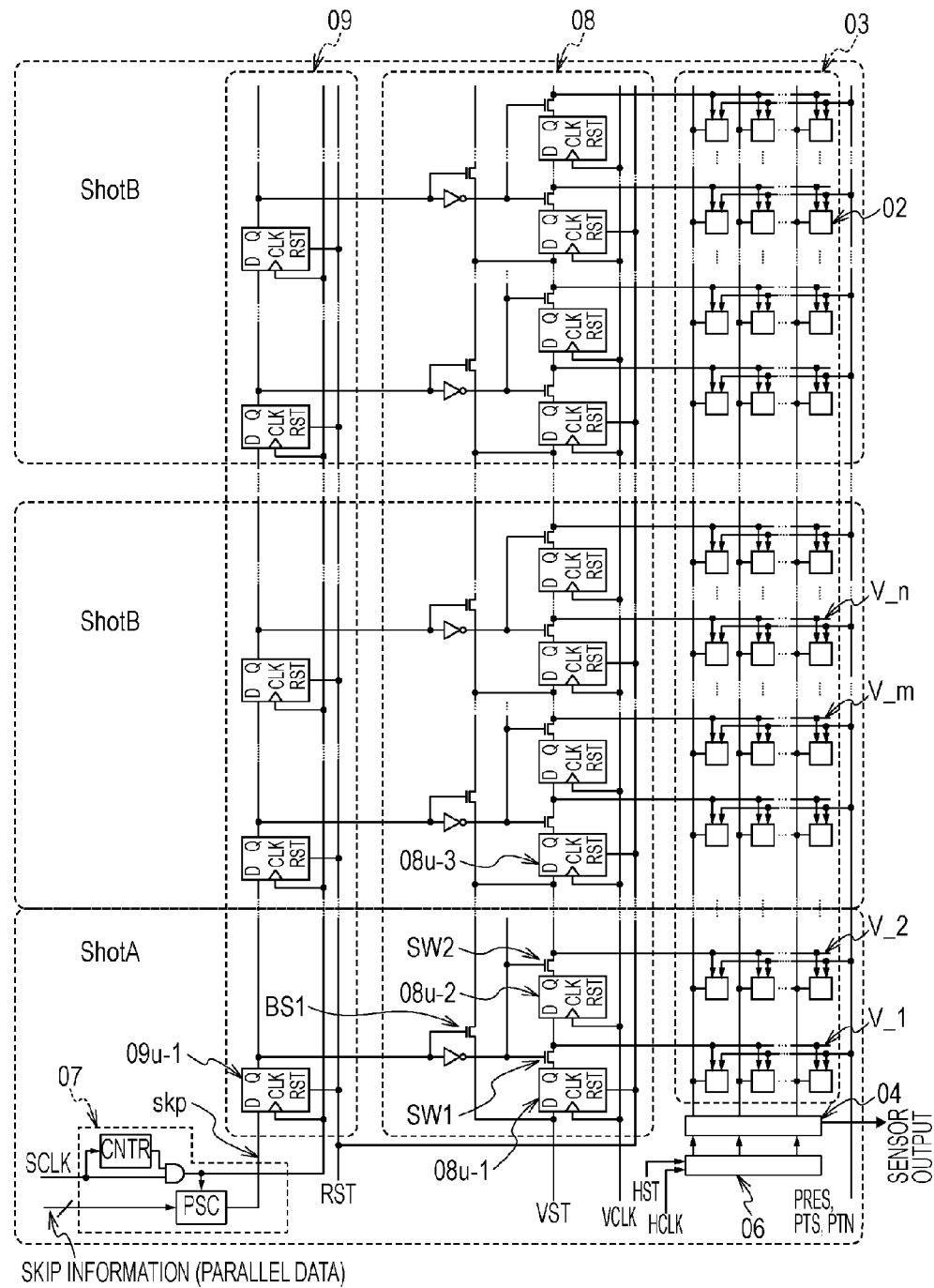
FIG. 2 is a circuit diagram of a configuration of the photoelectric conversion apparatus according to the first embodiment.

The vertical scanning circuit 05 includes a scanning shift register 08 functioning as a first shift register, and a memory unit 09 functioning as a second shift register. The scanning shift register 08 according to the present embodiment is constituted by connecting a plurality of unit registers 08u in series. The scanning shift register 08 receives a start pulse VST and a clock signal VCLK from the control unit 07 and performs a data shift operation in synchronism with the clock signal VCLK. In FIG. 2, among the plurality of unit registers 08u, reference numerals are given only to unit registers in first to third stages 08u-1 to 08u-3. Hereinafter, the description may be given without branched numerals assigned to the unit registers 08u in some cases. The same applies to the other elements that will be described below. The scanning shift register 08 is configured so as to be able to specify a register where the scanning is skipped. The memory unit 09 transmits skip information skp supplied from the control unit 07 and also holds this information. The memory unit 09 controls a skip function of the scanning shift register 08 on the basis of the held skip information skp. Although the second shift register also functions as a memory unit configured to store the skip information skp in the present embodiment, a memory unit configured to hold the skip information skp transmitted by the second shift register may be separately provided in addition to the second shift register.

The horizontal scanning circuit 06 receives a start pulse HST and a clock signal HCLK from the control unit 07 and performs a data shift operation in synchronism with the clock signal HCLK. Accordingly, the circuits in the respective columns of the column signal processing unit 04 are scanned, and the signals are sequentially output.

The control unit 07 supplies the signals for controlling the operation performed by the photoelectric conversion apparatus 01.

FIG. 2 is a circuit diagram of a configuration of a photoelectric conversion apparatus according to the present embodiment, in which the pixels 02 of 10 rows and 3 columns in the pixel array 03 are illustrated.

The scanning shift register 08 according to the present embodiment is configured so as to skip two adjacent unit registers 08u. The start pulse VST input to the scanning shift register 08 is supplied to a data input node of the unit register 08u-3 in the third stage via a data input node of the unit register 08u-1 in the first stage and a bypass switch BS1. An output node of the unit register 08u-1 in the first stage is connected to a data input node of the unit register 08u-2 in the second stage via an inter-register switch SW1. An output node of the unit register 08u-2 in the second stage is connected to a data input node of the unit register 08u-3 in the third stage via an inter-register switch SW2. The bypass switch BS1 is controlled by a signal having an opposite phase to a signal provided to the inter-register switches SW1 and SW2. In other words, in a case where the bypass switch BS1 is turned off, the inter-register switches SW1 and SW2 are turned on. Thus, in this case, the start pulse VST is input to the unit register 08u-3 through the shift operation by the unit registers 08u-1 and 08u-2. On the other hand, in a case where the bypass switch BS1 is turned on, the inter-register switches SW1 and SW2 are turned off. Thus, in this case, the start pulse VST is input to the unit register 08u-3 without being subjected to the shift operation by the unit registers 08u-1 and 08u-2. Therefore, it is possible to skip the unit registers 08u in the first and second stages. In the present example, two adjacent unit registers 08u are regarded as a functional block, and a plurality of functional blocks are connected in series. In other words, the scanning shift register 08 is constituted by including the plurality of functional blocks connected in series. An output of each unit register 08u is supplied to the pixel array 03 as a signal V_n for selecting a row of the pixels. Herein, "n" in V_n means an output of the unit register 08u in the n-th stage. Hereinafter, an electric path whose conduction state is controlled by turning on the bypass switch BS1 is referred to as bypass unit.

A plurality of memories 09u included in the memory unit 09 according to the present embodiment each include a D latch and constitute a shift register that performs a shift operation in synchronism with a clock signal SCLK' that will be described below. The memories 09u that constitute the memory unit 09 shift the skip information skp as data. In other words, according to the present embodiment, the vertical scanning circuit 05 includes the scanning shift register 08 corresponding to the first shift register and the memory unit 09 corresponding to the second shift register that stores the information for controlling the state of the corresponding bypass unit.

The control unit 07 includes a counter CNTR, an AND circuit, and a parallel/serial conversion unit (hereinafter, which will be referred to as P/S conversion unit) PSC. The counter CNTR is configured so as to perform a count operation in synchronism with a clock signal SCLK. Until a count value reaches a predetermined count value, the counter CNTR inputs a logic value at a high level to one of input terminals of the AND circuit. Then, when the count value reaches the predetermined count value, the counter CNTR inputs a logic value at a low level to the one of input terminals of the AND circuit. The clock signal SCLK is input to the other input terminal of the AND circuit. According to this configuration, only during a period until the count value of the counter CNTR reaches the predetermined value, the clock signal SCLK is supplied to the scanning shift register 08 via the AND circuit. Herein, an output of the AND circuit is denoted as SCLK'. The clock signal SCLK' is a clock signal having a phase which is delayed by a delay amount caused in the AND circuit with respect to the clock signal SCLK. On the other hand, the P/S conversion unit PSC converts the skip information as parallel data input externally into the skip information as serial data, and outputs in synchronism with the clock signal SCLK'. With the above described configuration, the skip information as the serial data is sequentially input to the memory unit 09 until the count value of the counter CNTR reaches the predetermined value, and is shifted within the memory unit 09 in synchronism with the clock signal SCLK'. By setting the predetermined count value M in the counter CNTR as a number equal to the number of the memories 09u included in the memory unit 09, it is possible to stop the shift operation in a state in which the skip information is held in all the memories 09u. The pixel 02 according to the present embodiment has a circuit configuration with which a so-called global shutter operation can be performed.

Figure 3:
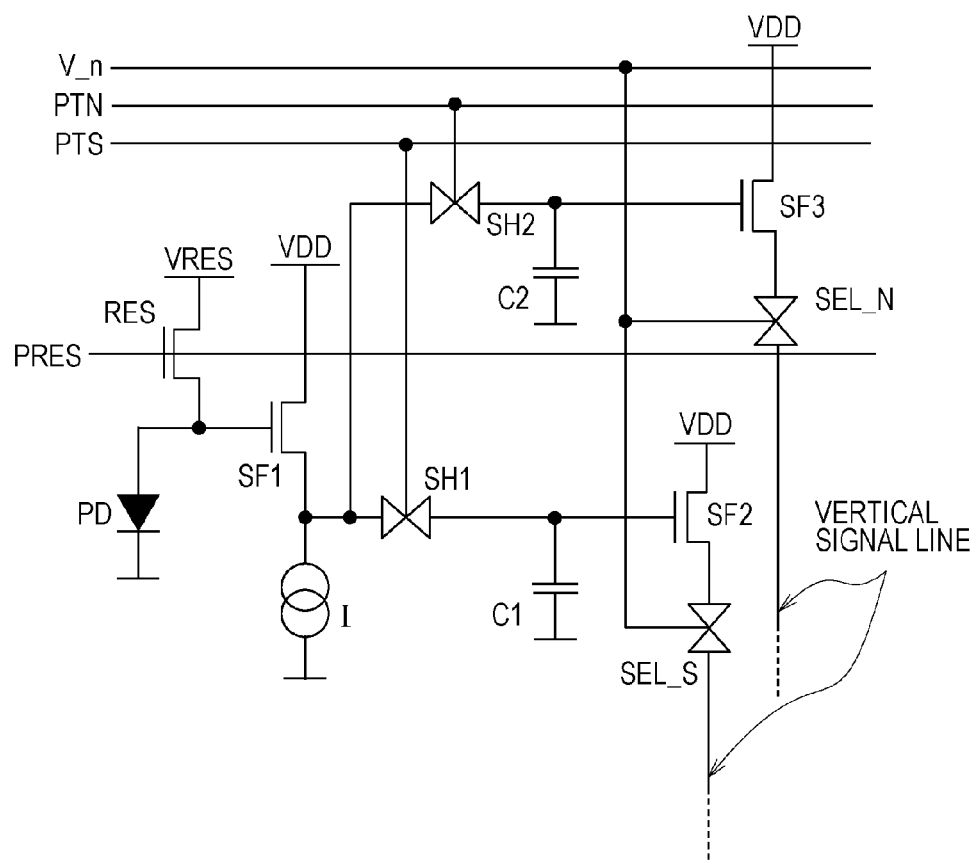
FIG. 3 is a circuit diagram of a configuration of a pixel according to the first embodiment.

FIG. 3 illustrates a configuration of the pixel 02 according to the present embodiment. The pixel 02 is constituted by including a photoelectric conversion element PD, a first amplification transistor SF1, a reset transistor RES, a constant current supply I, a first holding capacitance C1, a second holding capacitance C2, a second amplification transistor SF2, and a third amplification transistor SF3. An anode of the photoelectric conversion element PD is connected to a gate node of the first amplification transistor SF1, and is also connected to a reset power supply VRES via the reset transistor RES. The first amplification transistor SF1 operates as a source follower circuit together with the constant current supply I. An output node of the first amplification transistor SF1 is held at the first holding capacitance C1 or the second holding capacitance C2 via a sample hold switch SH1 or SH2. The first holding capacitance C1 is connected to a gate node of the second amplification transistor SF2. When a row selection switch SEL_S is in a conducting state, the second amplification transistor SF2 constitutes a source follower circuit together with a constant current source, not illustrated in the drawing, which is provided on a vertical signal line. The second holding capacitance C2 is connected to a gate node of the third amplification transistor SF3. When a row selection switch SEL_N is in a conducting state, the second amplification transistor SF2 constitutes the source follower circuit together with the constant current source, not illustrated in the drawing, which is provided on the vertical signal line. According to the present embodiment, the sample hold switches SH1 and SH2 are respectively controlled by control signals PTS and PTN. The control signals PTS and PTN are supplied, for example, from the control unit 07 and are commonly supplied to all the pixels 02 in the pixel array 03 according to the present embodiment. The row selection switches SEL_S and SEL_N are controlled by the output V_n of the vertical scanning circuit 05.

Next, an operation of the photoelectric conversion apparatus 1 will be described. A timing chart of FIG. 4 shows an operation in a case where signals are only read out from the pixels 02 of the m-th row to the n-th row in the pixel array 03, and no signals are read out from the pixels 02 in the other rows. A delay caused in the AND circuit of the control unit 07 is treated to be negligible.

In a skip setting period T, the clock signal SCLK repeats a periodic transition. According to the present embodiment, the same number of pulses of the clock signal SCLK as the number of the memories 09u of the memory unit 09 are input. The skip information skp is supplied to the memory unit 09 and transmitted to the memory 09u in the next stage in synchronism with the clock signal SCLK. When the skip setting period T is ended, the data at the high level is written in the memories 09u in an area corresponding to the first to the m-th rows in the pixel array 03 and an area corresponding to the n-th and subsequent rows. In other words, only with regard to the unit registers 08u from the m-th stage to the (n−1)-th stage are input, the output is input to the unit register 08u in the next stage.

Next, when a signal PRES is at the high level, the photoelectric conversion element PD and the gate node of the first amplification transistor SF1 are reset. While the sample hold switches SH1 and SH2 are temporarily turned on by the control signals PTS and PTN in this period, the first and second holding capacitances C1 and C2 are reset. When the signal PRES is set at the low level, charge accumulation in the photoelectric conversion element PD is started. When the control signal PTS is temporarily set at the high level after an elapse of an accumulation time, the output of the first amplification transistor SF1 in accordance with the charge amount accumulated in the photoelectric conversion element PD up to this time is held by the first holding capacitance C1. Thereafter, when the signals PRES and PTN are temporarily set at the high level again, the output of the first amplification transistor SF1 in a state in which the gate node of the first amplification transistor SF1 is reset is held by the second holding capacitance C2. The above described operation is commonly performed for all the pixels 02. Since both the first and second holding capacitances C1 and C2 include offset components derived from the first amplification transistor SF1, by performing differential processing of both the signals in a circuit in the downstream of the column signal processing unit 04, the offset components may be reduced.

Next, when the start pulse VST is input to the scanning shift register 08, in synchronism with rising of the clock signal VCLK, an output V_m of the unit register 08u-m in the m-th stage is brought to the high level. Accordingly, the output of the pixel 02 in the m-th row appears in the vertical signal lines in the respective columns and is transmitted to the column signal processing unit 04. Thereafter, the signals are sequentially output from the column signal processing unit 04 by the start pulse HST and the clock signal HCLK.

After this, in synchronism with the rising of the clock signal VCLK, the operation similar to the (m+1)-th row, the (m+2)-th row, . . . , the (n−1)-th row, and the n-th row is performed. Thus, the operation for one frame is ended.

According to the present embodiment, since the memory unit 09 constituted by including the plurality of memories 09u connected in series functions as the second shift register, an address where the scanning of the first shift register is skipped is set as serial data. Accordingly, the circuit can be simplified as compared to a case in which the address where the scanning is skipped is set by using the decoder as in a related art.

In addition, the technique according to the present disclosure is particularly useful to a case in which elements in a plurality of areas are formed by using the same mask pattern when forming the photoelectric conversion apparatus on a semiconductor substrate. In FIG. 2, it is supposed that the photoelectric conversion apparatus 1 is classified into an area (Shot A) including the control unit 07, the column signal processing unit 04, and the horizontal scanning circuit 06 in addition to parts of the pixels 02 and the vertical scanning circuit 05 and an area (Shot B) including parts of the pixel array 03 and the vertical scanning circuit 05. Herein, since the area illustrated in Shot B is formed by repeating the same unit, this area can be formed by using the same mask pattern a plurality of times. In a case where the above described technique of multiple-shot is used, and if the skip information skp is set by the decoder, a problem occurs that a relatively same address is selected at the same time in each of the plurality of areas in Shot B. In contrast, according to the technique according to the present disclosure, by supplying the skip information skp as the serial data, it is possible to form the plurality of areas of the photoelectric conversion apparatus by using the same mask pattern.

Second Embodiment

Figure 5A:
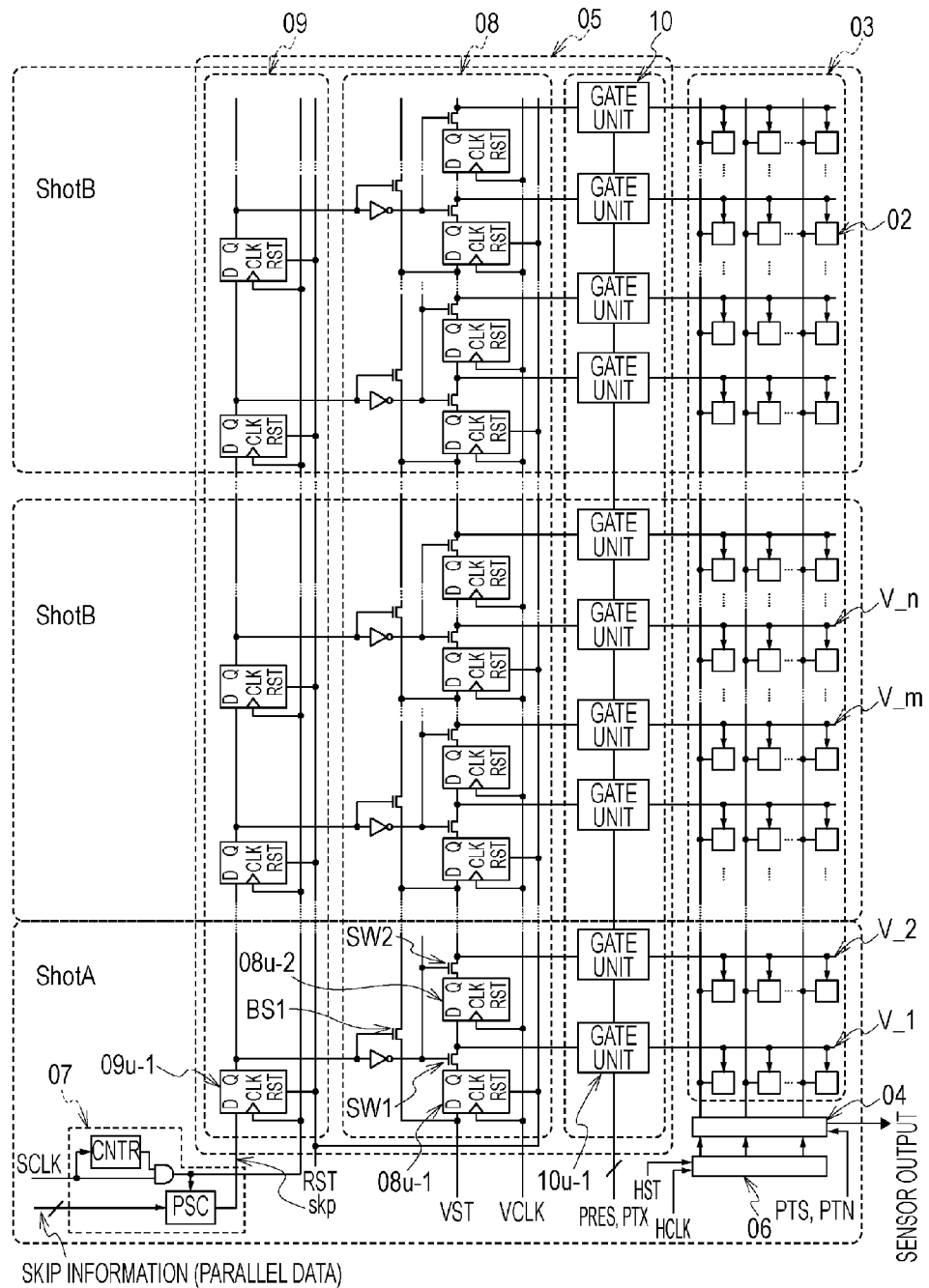
FIGS. 5A and 5B are circuit diagrams of a configuration of a photoelectric conversion apparatus according to a second embodiment.

FIG. 5A is a circuit diagram of a configuration of a photoelectric conversion apparatus 01' according to the present embodiment. A difference from FIG. 2 resides in that a gate unit 10 is provided. According to this difference, a so-called rolling shutter operation can be performed.

Figure 5B:
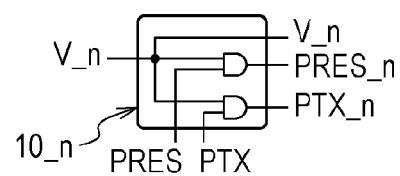

The gate unit 10 includes a plurality of unit gate units 10u. FIG. 5B shows a configuration of the unit gate unit 10u. The unit gate unit 10u can be constituted by using two AND circuits. The output V_n of the memory unit 09 is commonly received by one of input terminals in each of the two AND circuits. The signal PRES or PTX is received by the other input terminal. According to this configuration, only the pixel 02 in a row corresponding to the unit gate unit 10u to which the signal V_n at the high level is input is controlled.

Figure 6:
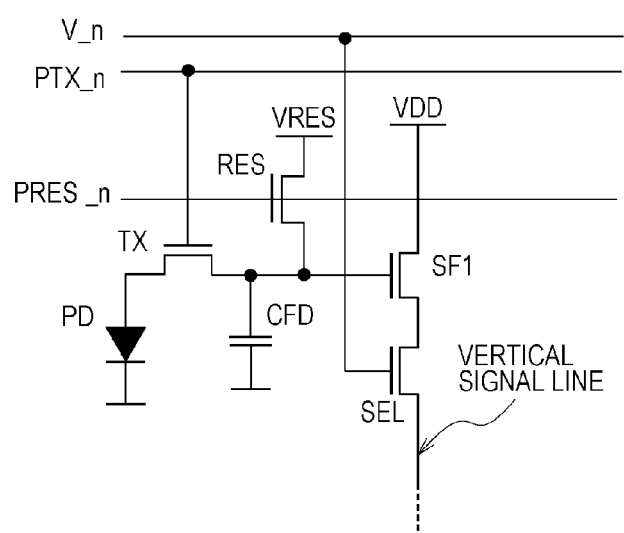
FIG. 6 is a circuit diagram of a configuration of a pixel according to the second embodiment.

FIG. 6 is an equivalent circuit diagram of the pixel 02 according to the present embodiment. From a comparison with the configuration illustrated in FIG. 3, the sample hold switches SH1 and SH2, the first and second holding capacitances C1 and C2, the second and third amplification transistors SF2 and SF3, the constant current supply I, and the row selection switches SEL_S and SEL_N are eliminated. Further, a transfer transistor TX is provided between the anode of the photoelectric conversion element PD and the gate node of the first amplification transistor SF1, and furthermore, a row selection switch SEL is provided between a source node of the first amplification transistor SF1 and the vertical signal line. The first amplification transistor SF1 constitutes the source follower circuit together with the constant current supply not illustrated in the drawing which is provided on the vertical signal line. The transfer transistor TX is controlled by an output PTX_n of the corresponding unit gate unit 10u, and the reset transistor RES is controlled by an output PRES_n of the corresponding unit gate unit 10u. In addition, the row selection switch SEL is controlled by an output V_n of the corresponding unit register 08u.

Figure 7:
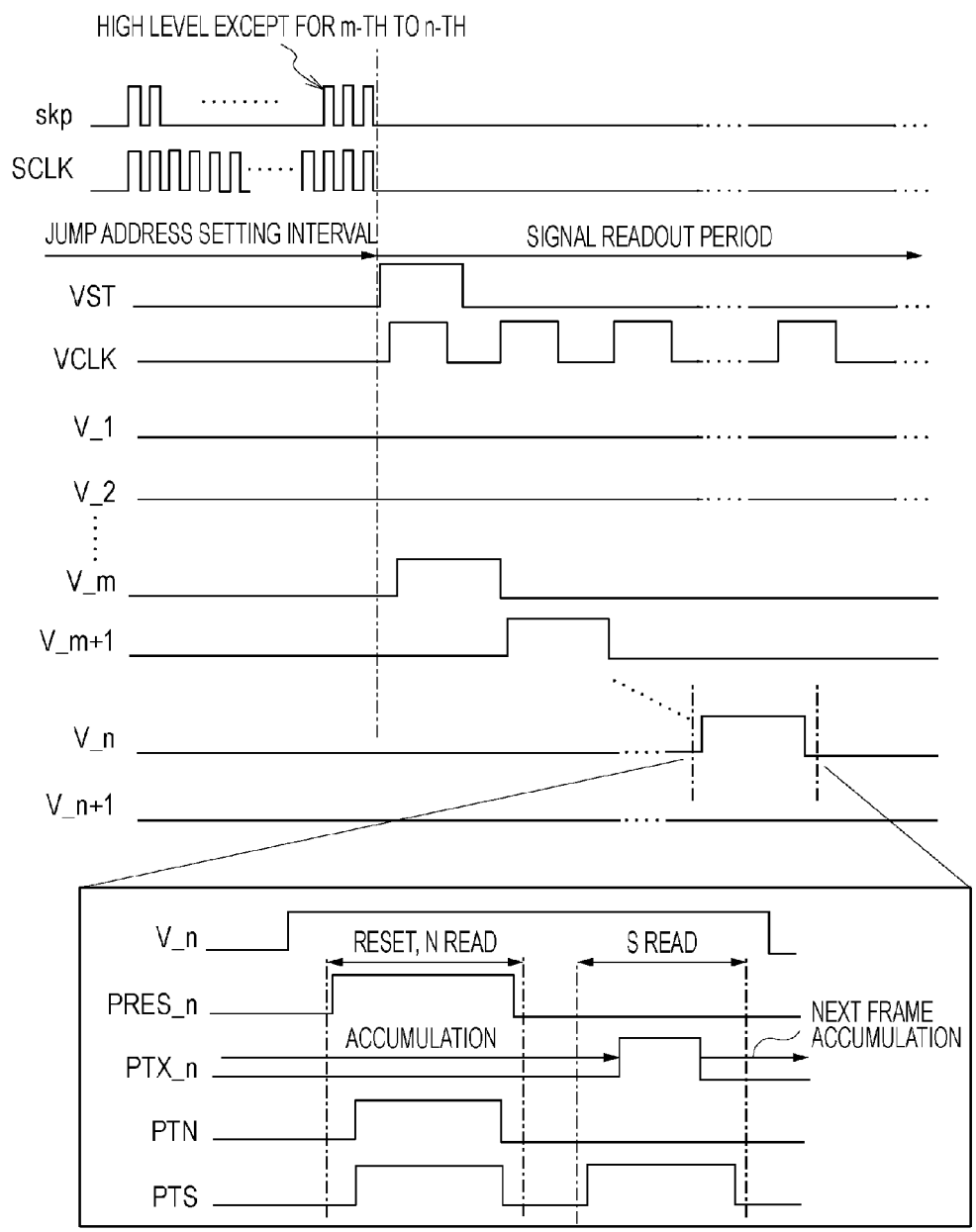
FIG. 7 is a timing chart for describing an operation according to the second embodiment.

Next, an operation of the photoelectric conversion apparatus 1' will be described. A timing chart of FIG. 7 shows an operation in a case where signals are only read out from the pixels 02 in the m-th row to the n-th row in the pixel array 03, and no signals are read out from the pixels 02 in the other rows. A delay caused in the AND circuit of the control unit 07 is treated to be negligible.

An operation of the skip setting period T is similar to FIG. 4.

After the end of the skip setting period T, signals are read out from the pixels 02 in the respective rows. Once the start pulse VST is input to the scanning shift register 08 in the first stage, in a subsequent period, the output of the scanning shift register 08 is shifted in synchronism with the rising of the clock signal VCLK.

During a period in which the pixels 02 in the n-th row are selected by the signal V_n, the signal PRES_n turns to the high level, and the gate node of the first amplification transistor SF1 is reset. Since the control signals PTN and PTS turn to the high level during this period, the output of the first amplification transistor SF1 at this time is held in the two sample hold circuits included in the column signal processing unit 04. After this, the transfer transistor TX is turned on when the signal PTX_n temporarily turns to the high level, and as a result, the charge accumulated in the photoelectric conversion element PD is transferred to the gate node of the first amplification transistor SF1. Accordingly, the output of the first amplification transistor SF1 fluctuates. The signal at this time is held in one of the two sample hold circuits included in the column signal processing unit 04 by the signal PTS.

The above described operation is performed for the pixels 02 in the m-th row to the n-th row, so that the rolling shutter operation in which the accumulation times are varied in the respective rows is performed.

Advantages similar to the first embodiment can also be attained with the present embodiment.

Third Embodiment

Figure 8:
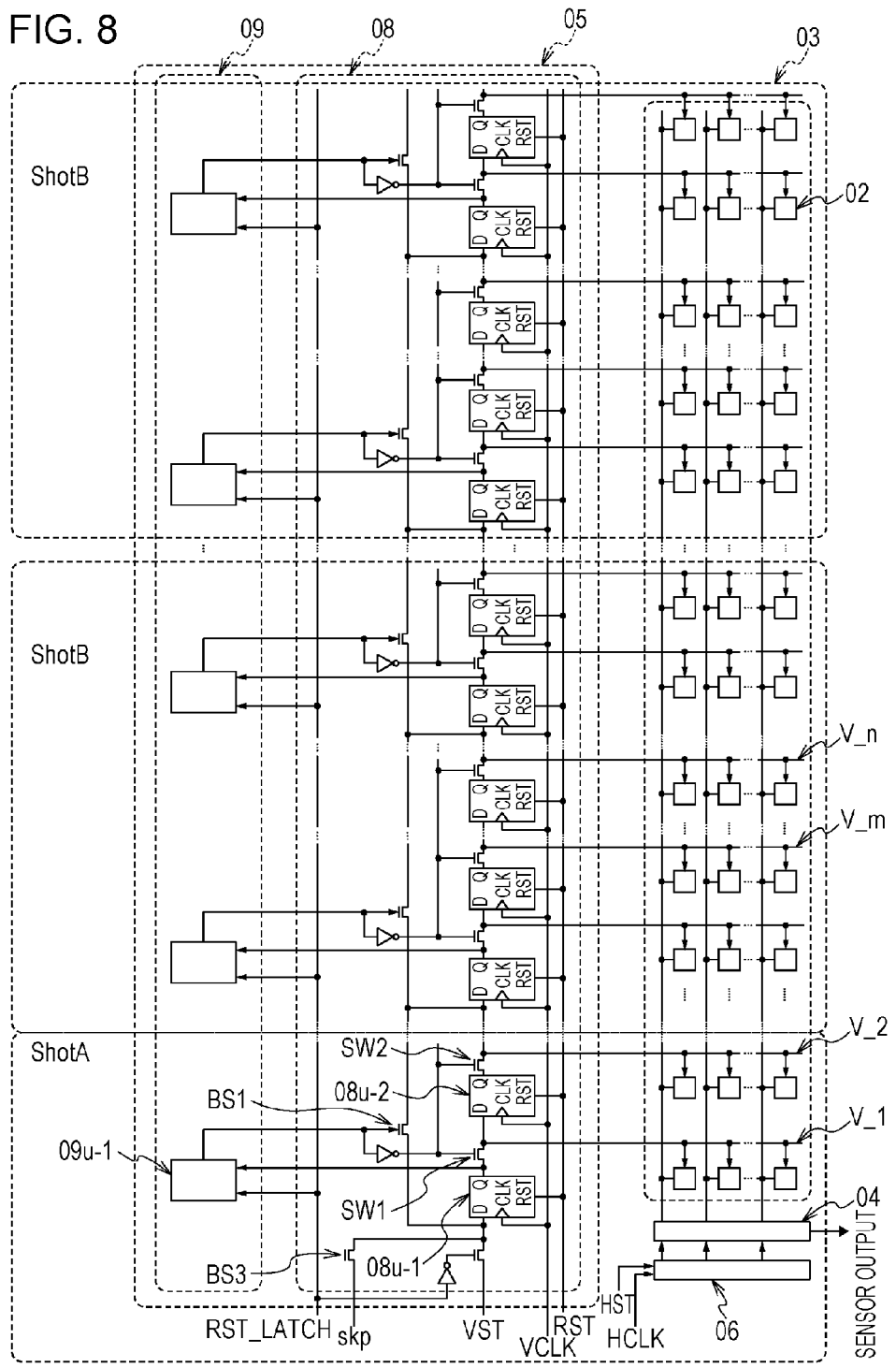
FIG. 8 is a circuit diagram of a configuration of a photoelectric conversion apparatus according to a third embodiment.

FIG. 8 is a circuit diagram of a configuration of a photoelectric conversion apparatus 01" according to the present embodiment. A difference from the first and second embodiments resides in that the scanning shift register 08 doubles as a part of the functions of the memory unit 09. According to the present embodiment, the memory unit 09 only has the function of holding the skip information skp, and the scanning shift register 08 corresponding to the first shift register serves the function of the second shift register for transmitting the skip information skp. In the following description, a different point from the above described embodiments will mainly be described. In FIG. 8, the control unit 07 is omitted.

One memory 09u is provided for every two unit registers 08u. The respective memories 09u are configured so as to hold the skip information skp transmitted by the corresponding unit registers 08u. The skip information skp held by the respective memories 09u is used for controlling the bypass switch BS1 and the inter-register switches SW1 and SW2 and is reset by a signal RST_LATCH. The memory 09u is reset in a case where the signal RST_LATCH is at the high level. When the signal RST_LATCH transits to the low level, the output of the scanning shift register 08 at that time is held by the memory 09u.

The signal RST_LATCH is, for example, a signal supplied from the control unit 07. The signal RST_LATCH is commonly input to the respective memories 09u, and an inversion signal thereof is also supplied to the scanning shift register 08. The start pulse VST or the skip information skp is input to the unit register 08u-1 in the first stage of the first shift register 08. The start pulse VST is input to the unit register 08u-1 via the switch that is controlled by the inversion signal of the signal RST_LATCH. The skip information skp is input to the unit register 08u-1 via a switch SW3. The switch SW3 is controlled by a signal supplied from the control unit 07.

Figure 9:
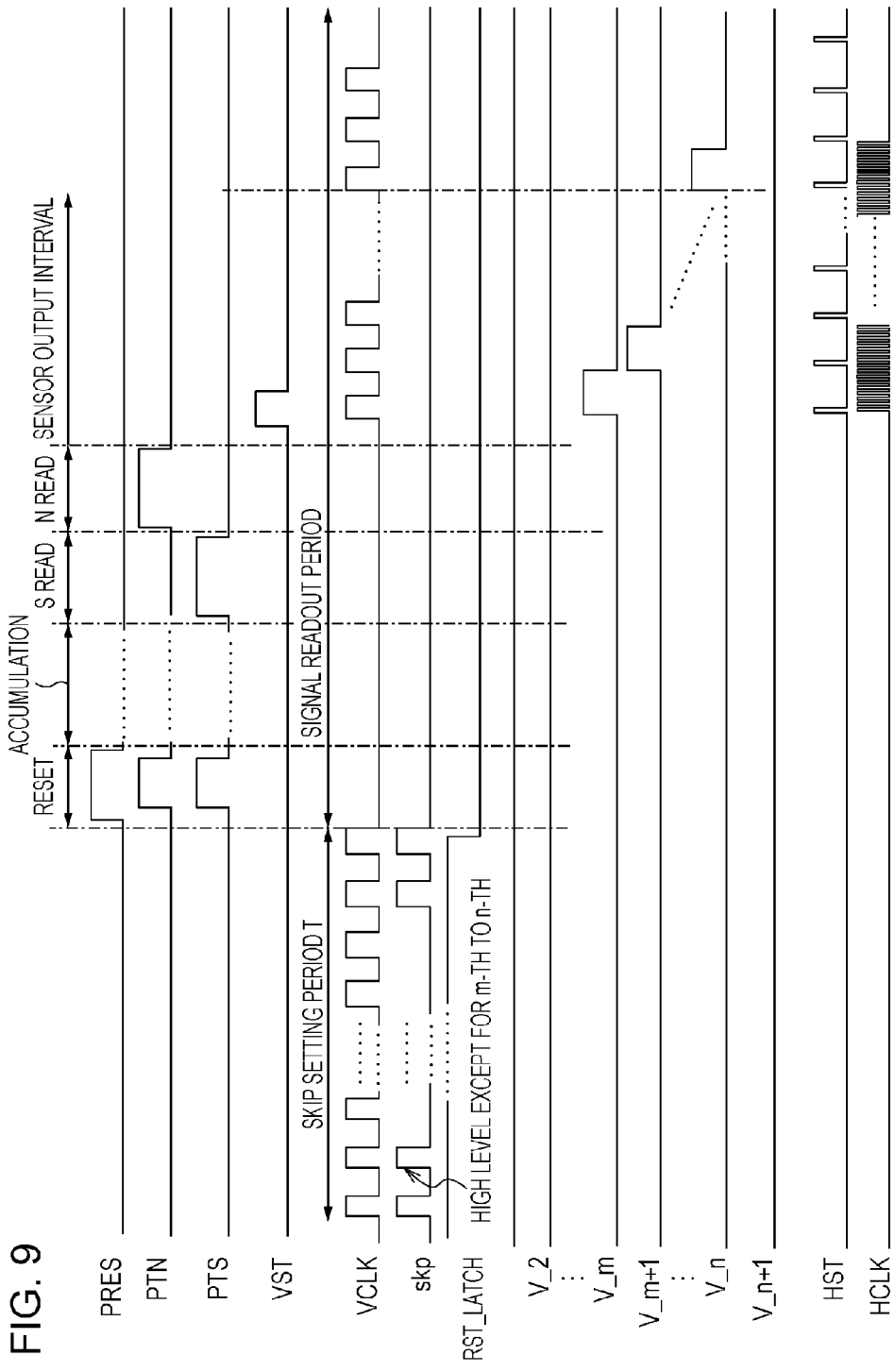
FIG. 9 is a circuit diagram of a configuration of the photoelectric conversion apparatus according to the third embodiment.

With reference to the timing chart of FIG. 9, an operation according to the present embodiment will be described. The timing chart shows an operation in a case where signals are only read out from the pixels 02 in the m-th row to the n-th row in the pixel array 03, and no signals are read out from the pixels 02 in the other rows.

A difference from the first embodiment resides only in the skip setting period T. Hereinafter, the description will be given under assumption that the switch SW3 is controlled by the signal RST_LATCH.

During the skip setting period T, the signal RST_LATCH is at the high level, and the memory 09u is in a state in which it is reset. Since the switch SW3 is turned on in this state, the skip information skp is input to the scanning shift register 08. The skip information skp according to the present embodiment is information for skipping the rows except for the m-th row to the n-th row in the pixel array 03 and is transmitted while being sequentially shifted by the scanning shift register 08 in synchronism with the clock signal VCLK. After the clock signal VCLK is input to the scanning shift register 08 a predetermined number of times, the signal RST_LATCH transits to the low level. Accordingly, the output of the scanning shift register 08 at this time is held in the corresponding memory 09u. Then, after the scanning shift register 08 is reset by a signal RST, the operation during the signal readout period is started.

Advantages similar to the first embodiment can also be attained with the present embodiment.

According to the present embodiment, similarly as in the first embodiment, the case of performing the global shutter operation where the accumulation times in all the pixels are set to be a same time is illustrated. However, as in the second embodiment, the rolling shutter operation may also be performed by providing the gate unit 10.

Advantages similar to the first and second embodiments can also be attained with the present embodiment.

Fourth Embodiment

Figure 10:
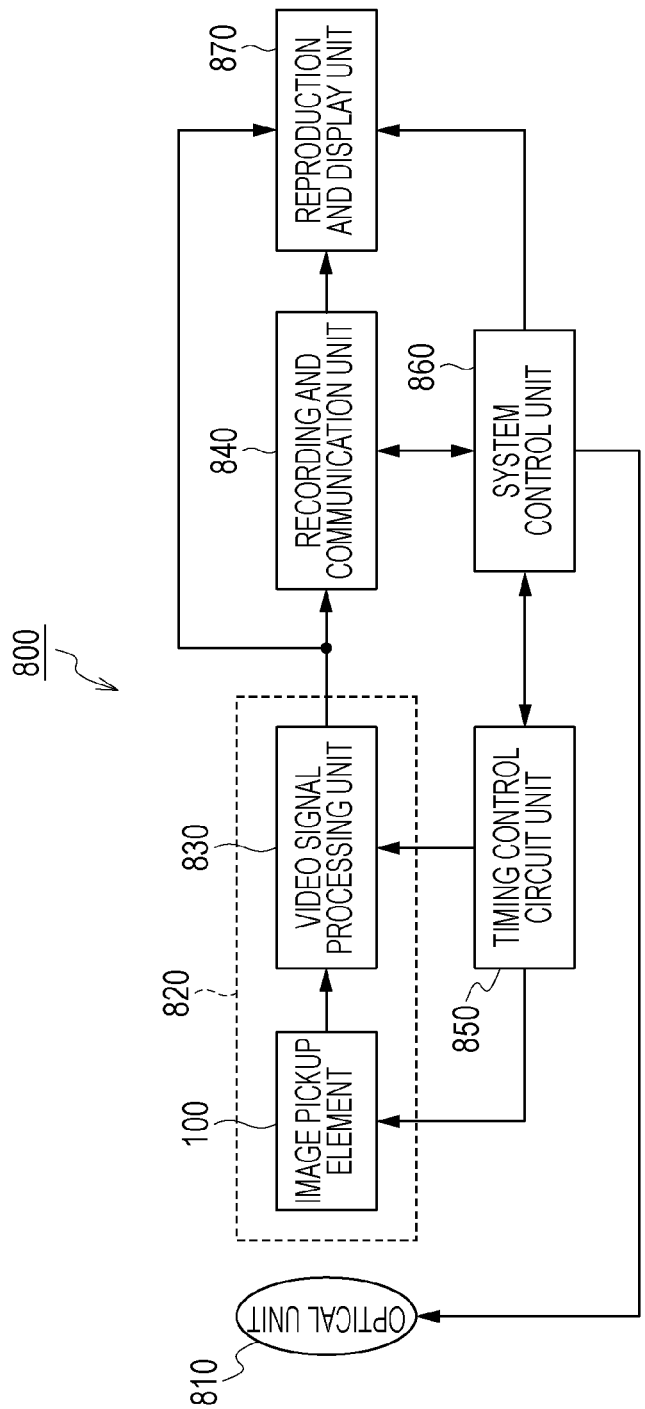
FIG. 10 is a block diagram of a configuration of an image pickup system according to a fourth embodiment.

FIG. 10 illustrates a configuration of an image pickup system according to the present embodiment. An image pickup system 800 includes, for example, an optical unit 810, an image pickup element 100, a video signal processing unit 830, a recording and communication unit 840, a timing control circuit unit 850, a system control unit 860, and a reproduction and display unit 870. An image pickup apparatus 820 includes the image pickup element 100 and the video signal processing unit 830. The photoelectric conversion apparatus described according to each of the above described embodiments is used for the image pickup element 100.

The optical unit 810, corresponding to an optical system such as a lens, focuses light from a subject on to a pixel portion 10 where a plurality of pixels are two-dimensionally arranged on the image pickup element 100, and an image of the subject is formed. The image pickup element 100 outputs a signal in accordance with the light focused on the pixel portion 10 at a timing based on a signal from the timing control circuit unit 850. The signal output from the image pickup element 100 is input to the video signal processing unit 830 corresponding to a video signal processing unit, and the video signal processing unit 830 performs signal processing in accordance with a method determined by a program or the like, so that image data is generated. The signal obtained by the processing in the video signal processing unit 830 is transmitted to the recording and communication unit 840 as the image data. The recording and communication unit 840 transmits the signal for forming the image to the reproduction and display unit 870, and the reproduction and display unit 870 is caused to reproduce or display a moving image or a still image. The recording and communication unit 840 also receives the signal from the video signal processing unit 830 to perform a communication with the system control unit 860, and also performs an operation of recording the signal for forming the image in a recording medium that is not illustrated in the drawing.

The system control unit 860 is configured to control an operation of an image pickup system. The system control unit 860 controls drive of the optical unit 810, the timing control circuit unit 850, the recording and communication unit 840, and the reproduction and display unit 870. The system control unit 860 is provided with a storage apparatus that is not illustrated in the drawing such as, for example, a recording medium. A program or the like used for controlling the operation of the image pickup system is recorded in the recording medium. The system control unit 860 supplies a signal for switching a drive mode in accordance with an operation by a user, for example, into the image pickup system. As a specific example, a change of a readout row or a reset row, a change of a field angle accompanied by an electronic zoom, a field angle shift accompanied by an electronic image stabilizing function, or the like is included. The timing control circuit unit 850 controls driving timings for the image pickup element 100 and the video signal processing unit 830 on the basis of the control by the system control unit 860.

Other Embodiments

According to the above described respective embodiments, the configuration in which the first shift register can skip every two unit registers is described, but the number of skipped unit registers is not limited to two.

According to the above described respective embodiments, the description has been given while the photoelectric conversion apparatus and the image pickup system are taken as the examples, but the scanning circuit according to the present disclosure can also be applied to other apparatuses.

According to the above described respective embodiments, the address of the area where the signal is read out, and the address of the area where the signal is not read, can be specified by a configuration simpler than that in the related art.

While the present invention has been described with reference to the above embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2013-141203, filed Jul. 5, 2013, which is hereby incorporated by reference herein in its entirety.

What is claimed is:

1. A photoelectric conversion apparatus comprising:
a pixel array in which a plurality of pixels are arranged in a matrix;
a first shift register including a plurality of registers connected in series and being operable to specify a register where scanning is skipped among the plurality of registers;
a second shift register adapted to transmit skip information for specifying the register to be skipped;
a plurality of bypass units provided in correspondence with the plurality of registers connected in series; and
a plurality of inter-register switches, each connects an output node of one of the plurality of registers and an input node of subsequent one of the plurality of registers,
wherein the second shift register controls the plurality of bypass units into an on state and an off state based on the skip information, and the plurality of inter-register switches into an on state and an off state on the basis of the skip information by providing signals having opposite phases to each other for the inter-register switch connected to the output node of one of the plurality of registers and the bypass unit connected to the input node of the one of the plurality of registers.

2. The photoelectric conversion apparatus according to claim 1,
wherein parts of the first and second shift registers are formed on a semiconductor substrate by using a same mask pattern a plurality of times.

3. The photoelectric conversion apparatus according to claim 1,
wherein the first shift register starts scanning after the second shift register transmits the skip information.

4. The photoelectric conversion apparatus according to claim 1 further comprising:
a row selection unit connected to the pixel array and configured to select a row of the pixel array,
wherein the row selection unit includes the first shift register and the second shift register.

5. The photoelectric conversion apparatus according to claim 4,
wherein the row selection unit includes a gate unit that performs gating on an output of the first shift register.

6. An image pickup system comprising:
a photoelectric conversion apparatus including a pixel array in which a plurality of pixels are arranged in a matrix; and
an optical system configured to form an image on the plurality of pixels,
wherein the photoelectric conversion apparatus further includes:
a first shift register including a plurality of registers connected in series and being operable to specify a register where scanning is skipped among the plurality of registers;
a second shift register adapted to transmit skip information for specifying the register to be skipped;
a plurality of bypass units provided in correspondence with the plurality of registers connected in series; and
a plurality of inter-register switches, each connects an output node of one of the plurality of registers and an input node of subsequent one of the plurality of registers, and
wherein the second shift register controls the plurality of bypass units into an on state and an off state on the basis of the skip information, and the plurality of inter-register switches into an on state and an off state on the basis of the skip information by providing signals having opposite phases to each other for the inter-register switch connected to the output node of one of the plurality of registers and the bypass unit connected to the input node of the one of the plurality of registers.

7. A photoelectric conversion apparatus comprising:
a pixel array in which a plurality of pixels are arranged in a matrix;
a first shift register including a plurality of registers connected in series and being operable to specify a register where scanning is skipped among the plurality of registers;
a plurality of memories; and
a plurality of bypass units provided in correspondence with the plurality of registers connected in series,
wherein
the first shift register transmits skip information for specifying the register to be skipped,
the plurality of memories hold the transmitted skip information, and wherein
the plurality of memories control the plurality of bypass units based on the skip information.

8. The photoelectric conversion apparatus according to claim 7,
wherein parts of the first and second shift registers are formed on a semiconductor substrate by using a same mask pattern a plurality of times.

9. The photoelectric conversion apparatus according to claim 7 further comprising:
a row selection unit connected to the pixel array and configured to select a row of the pixel array, wherein the row selection unit includes the first shift register and a second shift register.

10. The photoelectric conversion apparatus according to claim 9,
wherein the row selection unit includes a gate unit that performs gating on an output of the first shift register.

11. The system according to claim 6,
wherein parts of the first and second shift registers are formed on a semiconductor substrate by using a same mask pattern a plurality of times.

12. The system according to claim 6,
wherein the first shift register starts scanning after the second shift register transmits the skip information.

13. The system according to claim 6, wherein the photoelectric conversion apparatus further includes:
a row selection unit connected to the pixel array and configured to select a row of the pixel array,
wherein the row selection unit includes the first shift register and the second shift register.

14. The system according to claim 13,
wherein the row selection unit includes a gate unit that performs gating on an output of the first shift register.

* * * * *